Aug. 25, 1931. H. T. HERR Re. 18,168

REFRIGERATOR

Original Filed June 4, 1923 2 Sheets-Sheet 1

INVENTOR
Herbert T. Herr.
BY
Wesley G. Carr
ATTORNEY

Aug. 25, 1931. H. T. HERR Re. 18,168

REFRIGERATOR

Original Filed June 4, 1923 2 Sheets-Sheet 2

INVENTOR
Herbert T. Herr.
BY
Chester G. Barr
ATTORNEY

Reissued Aug. 25, 1931 Re. 18,168

UNITED STATES PATENT OFFICE

HERBERT T. HERR, OF PHILADELPHIA, PENNSYLVANIA, ASSIGNOR TO WESTINGHOUSE ELECTRIC AND MANUFACTURING COMPANY, A CORPORATION OF PENNSYLVANIA

REFRIGERATOR

Original No. 1,697,185, dated January 1, 1929, Serial No. 643,403, filed June 4, 1923. Application for reissue filed October 20, 1930. Serial No. 490,038.

My invention relates to refrigerating machines, particularly to small capacity machines of the compression type which are suitable for household use, and it has for an object to provide apparatus of the character designated which shall include evaporators having a high capacity and efficiency for absorbing heat.

It has for a further object to reduce the overall size of refrigerators of respective capacities by providing an evaporator of such shape and proportion as will closely conform to the interior of the refrigerator box and therefore occupy a minimum amount of space within the food storage chamber.

It has for a still further object to associate with the evaporator adequate facilities for the manufacture of a substantial quantity of ice for table or similar use.

These and other objects, which will be made apparent throughout the further description of the invention, may be attained by the employment of the apparatus hereinafter described and illustrated in the accompanying drawings, in which.

Compression refrigerators nominally comprise a chamber in which a working fluid is evaporated at a relatively low temperature and pressure, a chamber in which the vapors are condensed at a higher temperature and pressure, a compression mechanism for transmitting the vapors from the evaporation chamber to the condensing chamber, and a valved conduit for returning the condensed fluid at a reduced pressure to the evaporation chamber. The cycle is continuous during any period of operation, heat being absorbed from the medium surrounding the evaporation chamber to secure the desired refrigerating effect, which heat is removed from the apparatus by bringing an outside medium into heat-exchanging relation to the contents of the condensing chamber. Apparatus of this character generally operates intermittently, for example, a period of operation of from one to one and one-quarter hours being followed by a period of inactivity of from one and one-half to two hours, the length of the periods depending upon the duty imposed upon the refrigerator and upon the setting of the automatic devices for controlling the starting and stopping of the compression mechanism.

In the various types of compression refrigerators heretofore proposed, it has generally been the practice to provide evaporators of some suitable shape or proportions, having little regard for the inner contour of the refrigerator box. The arrangement of these evaporators within the box usually results in a considerable amount of unusable space being present in the upper portion thereof, as well as presenting a path of considerable resistance and a non-uniform area of flow for the circulation of air around the evaporators.

In my apparatus, I provide an evaporator of high efficiency which is so designed, with respect to the inner contour of the refrigerator box, as to completely utilize the upper portion thereof, leaving only sufficient space between its cooling surfaces and the box as is required for sufficient air circulation. Furthermore, this air space is of uniform flow area throughout, thereby inducing a steady, uniform siphonic circulation of air within the refrigerator box at all times. Because of the utilization of all available space in my apparatus, the size of the refrigerator box may be materially lessened for respective capacities, resulting in a decrease in radiating surface and a corresponding increase in efficiency of the refrigerating machine.

It is customary in machines of this type, to associate with the evaporation chamber or evaporator facilities for the manufacture of ice. In the various types of evaporators heretofore proposed, the ice manufacturing capacity has been very meagre and generally has not been sufficient to meet the requirements of the average household. In the evaporator of the present invention, ample facilities for the production of relatively large quantities of ice are provided in the large interior chamber of the evaporator.

Figure 1:
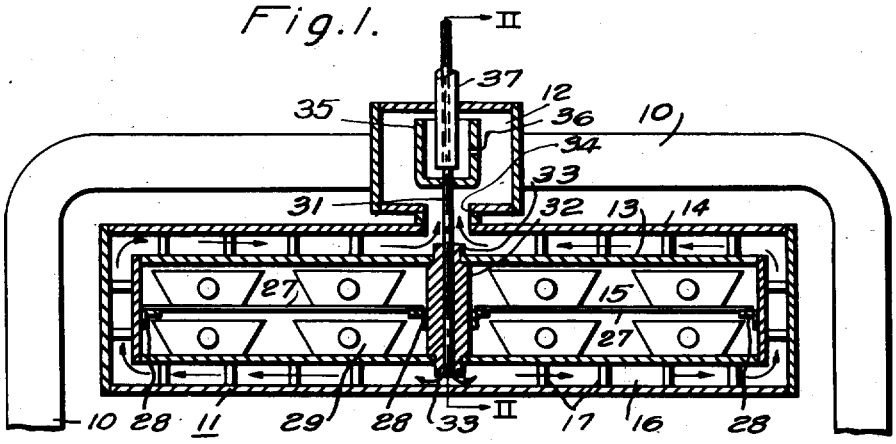
Figure 1 is a view in longitudinal section of an evaporator installed in the cold-storage box of a compression refrigerator.
Figure 2:
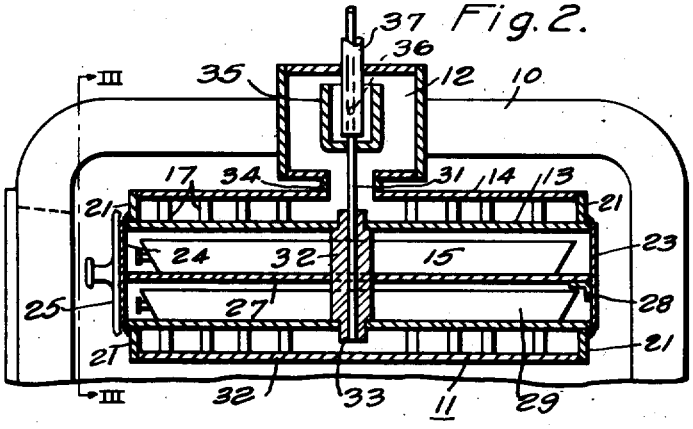
Fig. 2 is a transverse sectional elevation taken on the line II—II of Fig. 1.
Figure 5:
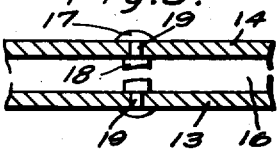
Fig. 5 is a detail view of a combined spacer and stiffener employed in the construction of my evaporator.

Referring to the drawings for a more detailed description of my invention, I show in Fig. 1 a refrigerator box 10 having disposed therein an evaporator 11 and superimposed upon the evaporator 11 is a surge tank or header 12. The evaporator 11 is composed of an inner heat conducting casing or shell 13 and an outer heat conducting casing or shell 14, forming an ice making compartment 15 and a working fluid circulating compartment 16. The inner casing 13 and the outer casing 14 are maintained in spaced relation by a plurality of stiffeners 17. The stiffener 17, as shown in Fig. 5, is provided with a body portion 18 having a length equal to the distance between the inner and outer casing, and end portions 19 of relatively smaller diameter, a part of each end portion being riveted over upon the outside of the casings and soldered thereto to insure gas tightness. The working fluid is confined within the circulating compartment 16 by flanging over the front and rear end portions 21 of the outer casing 14 and welding or soldering the ends thereof to the inner casing 13. It will be noted that the front and rear end portions 21 are connected to the inner casing 13 along a line short of the edges thereof. I have found from the actual manufacture of my apparatus, that such construction greatly facilitates the making of a gas tight joint between the inner and outer casings.

A relatively thin plate 23 extends across the rear of the ice making compartment 15 and is secured at the edges thereof to the inner casing 13. A similar plate 24 extends across the front of the ice making compartment and has provided therein suitable access openings which are closed by the doors 25. The doors 25 may be preferably supported upon spring hinges 26 so as to be biased to a closed position. The plates 23 and 24 and the doors 25 substantially prevent circulation of air between the ice making compartment 15 and the refrigerator box. The interior of the ice making compartment 15 may be provided with a removable shelf 27 carried upon suitable supporting members 28. A plurality of ice drawers or molds 29 of any well-known construction may be placed upon the shelf 27 and upon the lower portion of the casing 13.

Working fluid is conveyed to the circulating compartment 16 of the evaporator by a conduit 31 which extends downwardly through the surge tank 12 and evaporator 11 and terminates near the bottom thereof. In order to facilitate assembly and disassembly of my apparatus, I arrange the lower, or, that portion of the conduit 31 which is confined within the ice making compartment 15, concentrically within a central supporting member 32, the outer surface of the conduit being in bearing engagement therewith. A slight leakage of working fluid upwardly between the conduit and the central supporting member is insufficient to materially affect the performance of the apparatus. The central supporting member 32 is provided with end portions 33 of smaller diameter which extend beyond the inner casing. The central supporting member is welded or soldered to the upper and lower portions of the inner casing 13 and helps maintain them in spaced relation.

Figure 4:
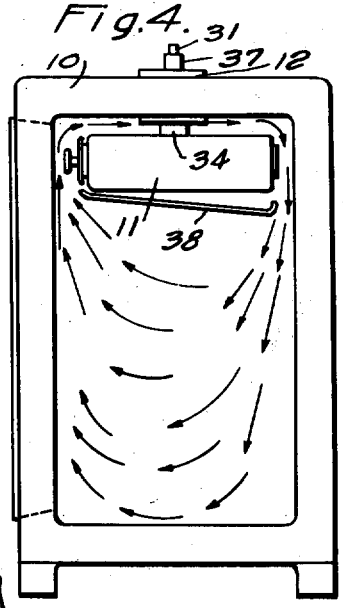
Fig. 4 is a transverse sectional elevation of the refrigerator box showing the circulation of air therein.
Figure 3:
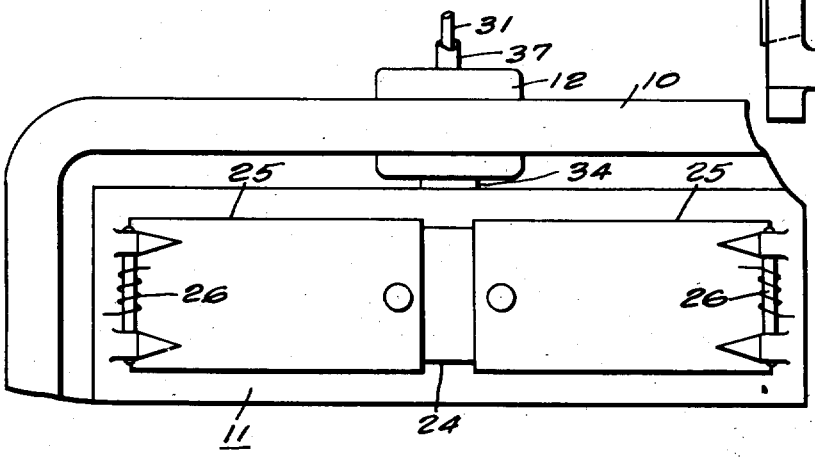
Fig. 3 is a longitudinal section taken on the line III—III of Fig. 2.

Refrigerant vapors are discharged from the circulating compartment 16 by means of a conduit 34 which communicates with the lower portion of the surge tank 12. Disposed within the surge tank is an upwardly-extending sleeve member 35, closed at the lower end and supported upon the inlet conduit 31. The circular opening between the upper end of the sleeve member 35 and the surge tank 12 is for the passage of refrigerant vapor, while the liquid working fluid is conveyed through a small hole or restricted opening 36 provided in the sleeve member 35 below the working level of the liquid in the outer compartment of the surge tank. An outlet conduit 37 is arranged concentrically without the conduit 31 and, as shown, extends downwardly into the tank, making a tight joint therewith where it passes through the upper portion. As shown in Fig. 4, a baffle 38 is disposed beneath the evaporator and extends the longitudinal length of the refrigerator box.

Figure 6:
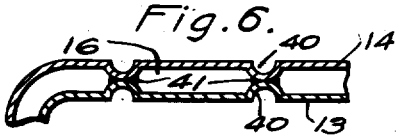
Figs. 6 and 7 are partial views in section of two modified forms of construction for the circulating compartment of the evaporator.
Figure 7:
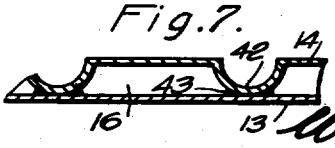
Figure 8:
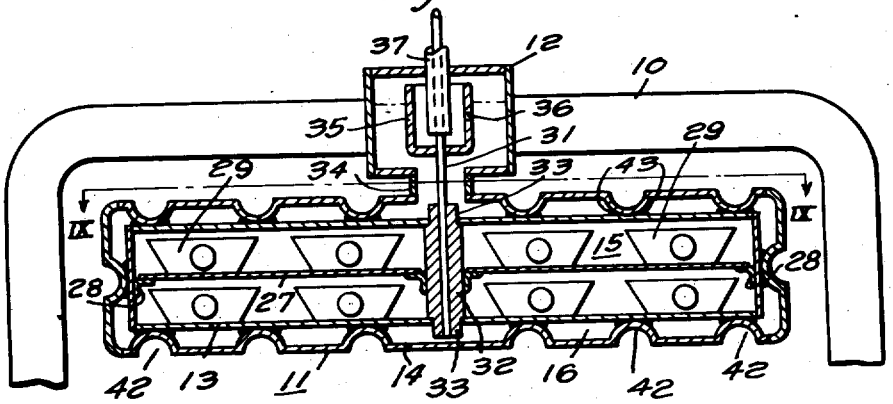
Fig. 8 is a view similar to Fig. 1, but showing the complete evaporator with the wall structure shown in Fig. 7.
Figure 9:
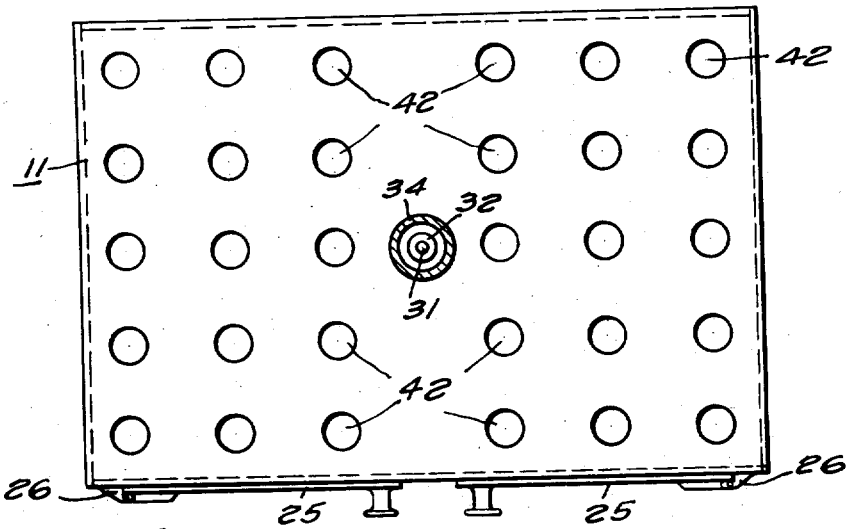
Fig. 9 is a sectional view taken on the line IX—IX in Fig. 8.
Figure 10:
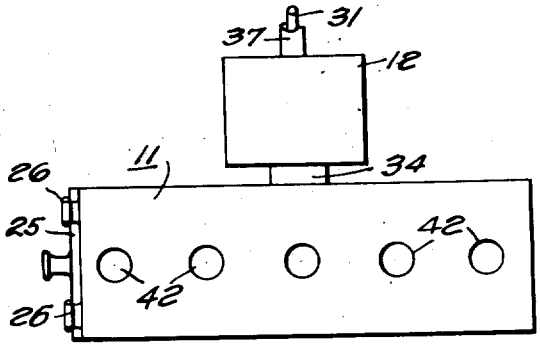
Fig. 10 is a side view of the cooling unit shown in Fig. 8.

Figs. 6 to 10 show modified forms of construction for the evaporator which eliminate the use of the stiffeners 17. As shown in Fig. 6, the outer casing 14 is provided with a plurality of circular indentations 40 which register with similar indentations in the inner casing 13, the two casings being spot welded together where the respective indentations make contact as at 41. In Figs. 7 to 10, only the outer casing is indented, the indentations 42 being of sufficient depth to make contact with the flat inner casing to which they are spot welded as at 43. By the use of either of these two forms of cons ruction, a strong and substantially built evaporator may be produced at a low cost of manufacture.

The operation of the apparatus thus described is as follows: The circulating compartment 16 of the evaporator is completely filled and the surge tank is filled to a level, such as indicated on the drawings, with a suitable working fluid. This working fluid may consist of a combined refrigerant and lubricant which readily mix one with the other. Upon starting the compression mechanism (not shown) of the refrigerator, liquid working fluid is supplied through the inlet conduit 31 to the lower portion of the circulating compartment 16 of the evaporator. Cooling effect is then produced in normal manner by the vaporization of the cooling agent caused by the low vacuum pressure maintained in the evaporator by the compressor (not shown). Heat is absorbed from the refrigerator box, or, air surrounding the outer surfaces of the evaporator, as well as from the inner or ice making compartment.

In the use of a considerable number of suitable working fluids for refrigerators of this type, and especially where a mixed lubricant and refrigerant comprise the working fluid, evaporation produces a violent ebullition or foaming. By providing a surge tank 12 and locating it with respect to the evaporator as illustrated, this foam is carried over into the surge tank, insuring a body of liquid working fluid being present in the entire circulating compartment of the evaporator at all times. Because of the relatively high specific heat of the liquid, a maximum of cold storage or heat absorption consistent with the size of the evaporator is obtained.

Refrigerant vapor passes out of the evaporator by means of the conduit 34 and rises upwardly through the liquid working fluid to the upper portion of the surge tank. It then passes over the upper end of the sleeve 35 and thence downwardly to the entrant portion of the outlet conduit 37 wherein it is once more conveyed to the suction of the compressor (not shown). The restricted opening 36, being located below the level of the liquid working fluid within the outer portion of the surge tank, a small amount of this fluid flows continuously to the outlet conduit 37, into the suction of the compressor and serves to lubricate the working parts thereof.

Refrigerators of this type are usually provided with automatic control means which stop the operation of the compression mechanism upon sufficient absorption of heat from the refrigerator box to produce a predetermined temperature therein, and which restart the mechanism upon a predetermined rise of the temperature therein. Ice may ordinarily be formed in the ice drawers 29 during one operation of the machine. Because of the plates 23 and 24 and the doors 25, which are provided at the ends of the ice making compartment 15, circulation of air between the refrigerator box and the ice making compartment is not permitted, and consequently the temperature of the ice making compartment is independent of the temperature of the refrigerator box. Should ice not be fully formed during one operation of the machine, the temperature prevailing within the ice making compartment will remain substantially constant during the inactive period of the machine, and the manufacture of the ice will be resumed upon a restarting of the device.

A thermo-siphonic circulation of air within the refrigerator box is, as indicated by the arrows in Fig. 4, induced by the heat absorption of the evaporator. The baffle 38 is disposed at such angle as will tend to direct the warm air upwardly, toward the front of the box. It then passes over the top and down past the sides and rear of the relatively cold evaporator to the food storage portion of the box. It will be noted that the air passages between the evaporator and the box are of constant flow area throughout, thereby minimizing resistance to flow and inducing a constant and efficient passage of air about the evaporator.

While I have shown my invention in but three forms, it will be obvious to those skilled in the art, that it is not so limited, but is susceptible of various other changes and modifications, without departing from the spirit thereof, and I desire, therefore, that only such limitations shall be placed thereupon as are imposed by the prior art or as are specifically set forth in the appended claims.

I claim as my invention:

1. In apparatus for cooling a refrigerator, the combination of a cooling receptacle having heat-conducting walls, and a jacket surrounding the receptacle and terminating short of the ends thereof and having heat-conducting walls which define, with the walls of the receptacle, an evaporation chamber.

2. The combination with a refrigerator box, of a cooling element arranged within the refrigerator box and comprising a plurality of compartments joined in stepped relation, the joint connecting the compartments being exposed to the interior of the refrigerator box, one of said compartments forming an ice-making chamber and the other of said compartments forming a refrigerant expansion chamber.

3. The combination with a refrigerator box, of a cooling element disposed within the refrigerator box comprising an inner compartment forming an ice-making chamber and an outer compartment disposed about the inner compartment and forming a refrigerant expansion chamber, said ice-making chamber and said refrigerant expansion chamber being joined in stepped relation and so arranged that the joint is exposed to the interior of the refrigerator box.

4. Refrigerant liquid storage and evaporating means for a refrigerating apparatus comprising, in combination, a fabricated unitary structure comprising a surge tank or header providing a chamber for liquid and gaseous refrigerant, and a liquid-evaporating chamber positioned below the header and comprising a pair of metallic casings spaced apart to form a passage for liquid refrigerant, a cooling chamber within the casings, one of said casings being welded at its periphery to the other of said casings to provide a closed container for liquid refrigerant, said passage being in open communication with the liquid in the header, the walls of said cooling chamber being submerged in liquid refrigerant and substantially uniformly exposed to the liquid temperature, and means for maintaining said casings substantially rigid and in spaced relationship, said means comprising a plurality of welded portions uniting the casings intermediate their peripheries.

5. In an evaporating unit a header comprising a casing forming the sides and top of a liquid and gas chamber, and a liquid-distributing and spreading chamber for heat-exchange purposes, comprising a pair of spaced and nested casings directly connected to said first named casing and having the space between the casings closed at the ends and in communication with the fluid in the first-mentioned casing, said nested casings being in physical contact at spaced intervals intermediate their peripheries, and means comprising welded portions for maintaining the second-named casings rigid and in spaced relation at the contacting intervals.

6. Refrigerant liquid storage and evaporating means for refrigerating apparatus comprising a fabricated unitary structure formed of a pair of nested sheet-metal casings spaced apart but having one of said casings joined at its periphery to the other of said casings to provide a relatively shallow refrigerant chamber, said chamber in operating condition being substantially filled with liquid refrigerant, the inner casing being so formed as to provide a longitudinal freezing chamber for receiving an icy tray, and means for rigidly fastening said casings to each other at a plurality of points intermediate their peripheries whereby to prevent deformation of the casings under pressures other than atmospheric.

7. Refrigerant liquid storage and evaporating means for refrigerating apparatus comprising a fabricated unitary structure formed of a pair of nested sheet-metal casings spaced apart but having one of said casings joined at its periphery to the other of said casings to provide a relatively shallow refrigerant chamber, said chamber in operating condition being substantially filled with liquid refrigerant, the inner casing being so formed as to provide a longitudinal freezing chamber for receiving an ice tray, means associated with the inner casing for supporting said tray, and means for rigidly fastening said casings to each other at a plurality of points intermediate their peripheries whereby to prevent deformation of the casings under pressures other than atmospheric, said means comprising a plurality of spaced welded portions.

8. A heat-absorbing unit for refrigerating apparatus comprising a horizontally disposed sheet-metal casing so arranged as to form an open ended freezing compartment for the reception of articles to be frozen, a second sheet-metal casing disposed around the first casing and having a substantial portion of its surface in contact with the first casing but having the remaining portion of its surface spaced therefrom, one of said casings being welded at its periphery to the other of said casings to provide a closed chamber for containing a substantial body of liquid refrigerant, and means comprising welded portions for uniting the casings to each other at the points of contact between the first and second casings whereby to provide strength and rigidity against pressures other than atmospheric inside the refrigerant chamber.

9. A heat-absorbing unit for refrigerating apparatus comprising a horizontally disposed sheet-metal casing so arranged as to form an open ended freezing compartment for the reception of articles to be frozen, a second sheet-metal casing disposed around the first casing, and having a substantial portion of its surface in contact with the first casing but having the remaining portion of its surface spaced therefrom, one of said casings being welded at its periphery to the other of said casings to provide a closed chamber for containing a substantial body of liquid refrigerant, means comprising welded portions for uniting the casings to each other at the points of contact between the first and second casings whereby to provide strength and rigidity against pressures other than atmospheric inside the refrigerant chamber, and a sheet-metal surge tank or header formed integrally with the outer casing and in open communication with the liquid in the refrigerant chamber.

10. A heat-absorbing unit for refrigerating apparatus comprising a horizontally disposed sheet-metal casing so arranged as to form an open ended freezing compartment for the reception of articles to be frozen, a second sheet-metal casing disposed around the first casing, and having a substantial portion of its surface in contact with the first casing but having the remaining portion of its surface spaced therefrom, one of said casings being welded at its periphery to the other of said casings to provide a closed chamber for containing a substantial body of liquid refrigerant, means comprising welded portions for uniting the casings to each other at the points of contact between the first and second casings whereby to provide strength and rigidity against pressures other than atmospheric inside the refrigerant chamber, a sheet-metal surge tank or header formed integrally with the outer casing and in open communication with the liquid in the refrigerant chamber, and refrigerant inlet and outlet conduits passing through a wall of said surge tank.

11. A heat-absorbing unit for refrigerating apparatus comprising a horizontally disposed sheet-metal casing so arranged as to form an open ended freezing compartment for the reception of articles to be frozen, a second sheet-metal casing disposed around the first casing, and having a substantial portion of its surface in contact with the first casing but having the remaining portion of its surface spaced therefrom, one of said casings being welded at its periphery to the other of said casings to provide a closed chamber for containing a substantial body of liquid refrigerant, means comprising welded portions for uniting the casings to each other at the points of contact between the first and second casings whereby to provide strength and rigidity against pressures other than atmospheric inside the refrigerant chamber, and a closure for the rear end of the freezing compartment fixedly secured to said casings.

12. A heat-absorbing unit for refrigerating apparatus comprising a horizontally disposed sheet-metal casing so arranged as to from an open ended freezing compartment for the reception of articles to be frozen, a second sheet-metal casing disposed around the first casing, and having a substantial portion of its surface in contact with the first casing but having the remaining portion of its surface spaced therefrom, one of said casings being welded at its periphery to the other of said casings to provide a closed chamber for containing a substantial body of liquid refrigerant, means comprising welded portions for uniting the casings to each other at the points of contact between the first and second casings whereby to provide strength and rigidity against pressures other than atmospheric inside the refrigerant chamber, said outer casing being provided on its upper surface with an enlarged integral portion forming a surge tank or header for containing liquid and gaseous refrigerant, said enlarged portion being in open communication with the liquid in the refrigerant chamber.

HERBERT T. HERR.